Figure 6:
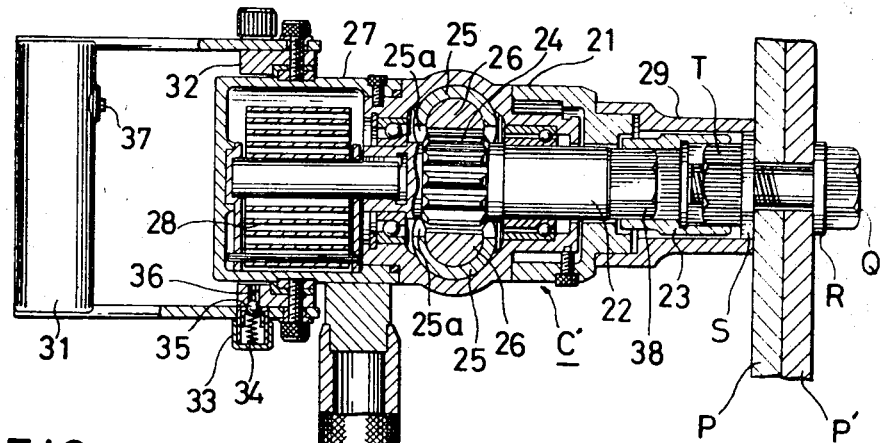

United States Patent

[11] 3,633,446

| [72] | Inventors | Kenich Tadahira<br>Kawasaki;<br>Jiro Kojima, Tokyo, both of Japan |
|---|---|---|
| [21] | Appl. No. | 871,804 |
| [22] | Filed | Oct. 22, 1969 |
| [45] | Patented | Jan. 11, 1972 |
| [73] | Assignee | Taisei Kensetsu Kabushiki Kaisha<br>Chuo-ku, Tokyo, Japan |
| [32] | Priority | Dec. 13, 1967 |
| [33] | | Japan |
| [31] | | 42/79550 |
| | | Original application May 31, 1968, Ser. No. 733,655, now Patent No. 3,581,383. Divided and this application Oct. 22, 1969, Ser. No. 871,804 |

[54] DEVICE FOR TIGHTENING A NUT AND BOLT ASSEMBLY
6 Claims, 20 Drawing Figs.

[52] U.S. Cl. ........................................ 81/57.46, 81/55, 81/57.39
[51] Int. Cl. ........................................ B25b 13/00, B25b 13/46
[50] Field of Search .......................... 81/57.46, 57.39, 55, 56, 52.4, 3.01; 29/240

[56] References Cited
UNITED STATES PATENTS

| 2,880,770 | 4/1959 | Ettinger | 81/52.4 X |
| 2,928,302 | 3/1960 | Owen et al. | 81/56 |
| 3,331,269 | 7/1967 | Sauter | 81/56 X |
| 665,281 | 1/1901 | Stevenson | 81/57.46 X |
| 2,594,964 | 4/1952 | Meyers | 81/57.46 |
| 2,836,090 | 5/1958 | Ray | 81/57.46 |

*Primary Examiner*—James L. Jones, Jr.
*Attorney*—Wenderoth, Lind & Ponack

ABSTRACT: An improved device for tightening a nut and bolt assembly wherein a washer and a nut are fitted to a threaded end portion of a bolt inserted through bores in members to be clamped together to cause the washer to be pressed against the surface of the member to be clamped. A rotary rod which is adapted to be rotated by hydraulic pressure has an extremal end and a cylinder concentrically surrounding said rotary rod has an extremal end for engaging with said nut and washer, respectively. Means are provided for supplying hydraulic pressure to rotate the rotary rod, thereby applying a torque to and rotating the nut simultaneously, such that the washer is prevented from rotating, and the point of engagement between the washer and the cylinder absorb the reaction force created. When a predetermined torque is reached, the hydraulic pressure is automatically terminated.

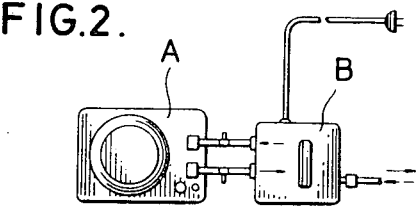
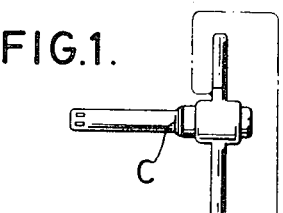
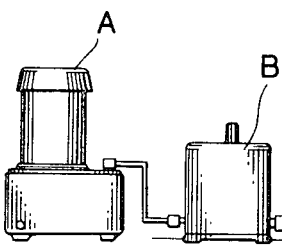
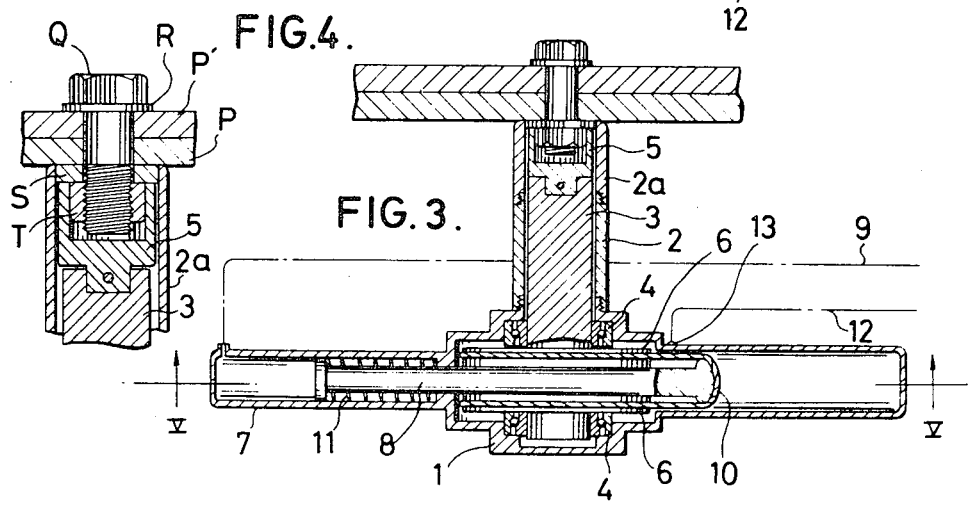
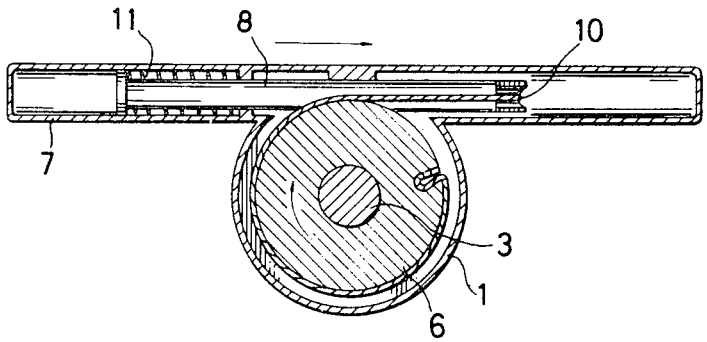

KENICHI TADAHIRA AND
JIRO KOJIMA
*INVENTORS*

DEVICE FOR TIGHTENING A NUT AND BOLT ASSEMBLY

This application is a division of my copending application Ser. No. 733,655, filed May 31, 1968 now U.S. Pat. No. 3,581,383.

The present invention relates to improvements in a device for tightening a nut and bolt assembly.

One of the principal objects of the present invention is to provide an improved device for tightening a nut and bolt assembly wherein, a nut is screwed onto the bolt easily and reliably with a predetermined axial stress by the use of means for producing torque by hydraulic pressure.

Another principal object of the present invention is to provide such an improved device with which the assembly may be tightened to a predetermined torque with little fluctuation in the torque value.

Another principal object of the present invention is to provide such an improved method device with which the reaction force created upon tightening the bolt is taken up by an outer cylinder of the device to eliminate the necessity of supporting the device with a large force and thus allowing the bolt tightening operation to be carried out in a simple manner.

A still further principal object of the present invention is to provide such an improved device which does not generate noises during its operation.

In order to achieve the above-described objects, the present invention comprises a washer and a nut fitted to a threaded end portion of a bolt inserted through a bore in members to be clamped so as not to rotate together with the bolt, to cause said washer to be pressed against the surface of the member to be clamped; a rotary rod having an end portion for grasping the bolt and adapted to be driven by hydraulic pressure, an outer cylinder having an end portion for grasping a washer, means for and driving said rotary by making use of the point of engagement between said washer and said outer cylinder as a reacting point, to apply a torque and thereby tighten said bolt with a predetermined torque.

Upon fitting a washer and a nut to a threaded end portion of a bolt inserted through the members to be clamped and clamping said nut as is the case of the present invention, the clamping force F, acting between the bolt and the nut, the clamping force $F_2$ acting between the nut and the upper surface of the washer, and the clamping force $F_3$ acting between the plate to be clamped and the washer, are always equal to one another. Also, in general, the coefficient of friction along the threads between the bolt and the nut is smaller than the coefficient of friction between the washer and the member to be clamped, so that if a torque is actuated between the nut and the washer, the nut is rotated while the washer in fixed and thus the tightening of the nut is carried out. Therefore, according to the present invention, after the washer and the nut are fitted to the end portion of the bolt inserted through the members to be clamped and are fastened to such extent that they do not rotate together with the bolt, when the nut-connecting portion at the extremity of the rotary rod and the external connecting portion of the outer cylinder fitted concentrically around said rotary rod are caused to engage said nut and washer, respectively, and said rotary rod is driven by hydraulic pressure to apply a torque, as described above; a sufficiently large reaction force is transmitted to the outer cylinder which is connected to said washer. The present invention results in various advantages in that it is possible to apply torque to said nut by making use of the washer as a reacting point, to tighten the nut with a predetermined sufficiently large torque; that the fluctuation in the fastening torque is less than with the fastening devices of the prior art which rely upon impulsive forces by using inertia, and thus the tightening of the bolt is carried out reliably to a predetermined torque; that since the reaction force is born by the outer cylinder when the bolt is tightened and thereby the forces generated upon tightening the bolt are balanced within the body of the device, there is no need to support the device with a large force and that since the nut is tightened by hydraulic torque-producing means, no noises are generated during the operation.

Other features and advantages of the present invention will become apparent from the following description taken in conjunction with the accompanying drawings, in which:

FIGS. 1 and 2 are a front view and a partial plan view, respectively, which schematically represent a device according to the present invention, FIG. 3 is a longitudinal cross section view showing the operating state of this device, FIG. 4 is an enlarged view of FIG. 3, FIG. 5 is a transverse cross section view taken along line v–v in FIG. 3.

Figure 7:
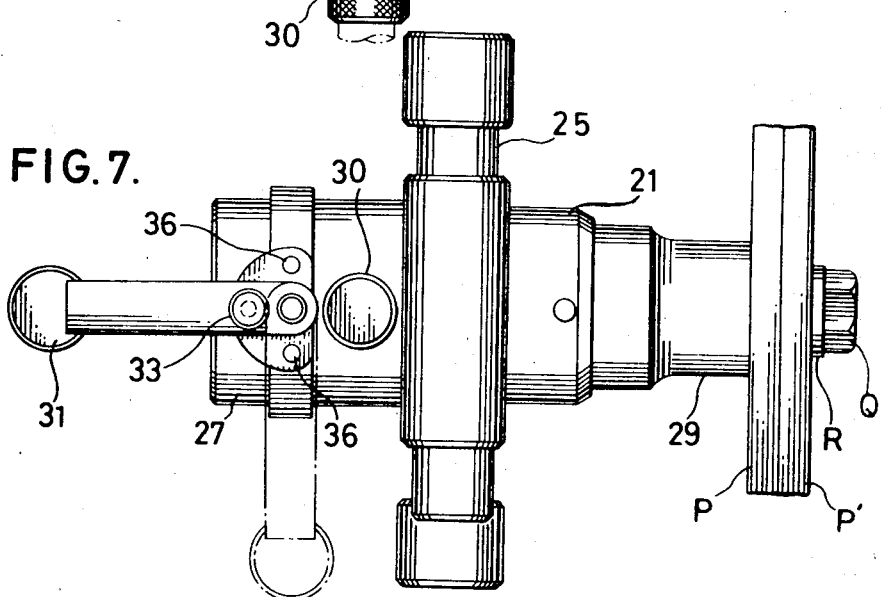
Figure 8:
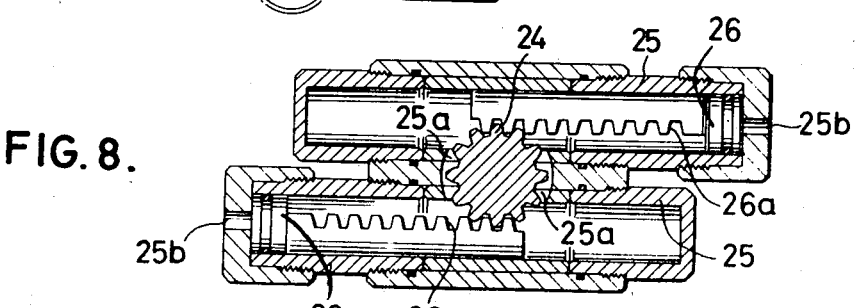
Figure 9A:
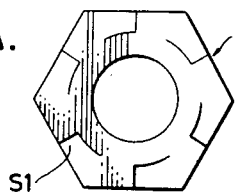
Figure 9B:
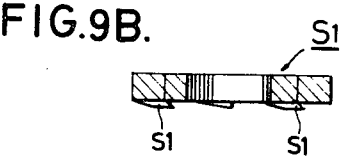

FIGS. 6 and 7 are a longitudinal cross section view and a plan view, respectively, showing another device according to the present invention, FIG. 8 is a transverse cross section view of rotational torque generating means of FIG. 6, and FIGS. 9A and 9B through FIGS. 14A and 14B respectively are plan views and longitudinal cross section views showing various preferred embodiments of the washers suitable for the use with the device of the present invention.

Now the invention will be described with reference to the illustrated embodiments. IN FIGS. 1 and 2, A represents a pumping device, B represents a control box, and C represents the body of one device according to the present invention. As shown in FIGS. 3 to 5, in said body an outer cylinder 2 is projected from a housing 1, and at the extremity of said outer cylinder 2 is detachably mounted a socket 2a forming the connecting portion for engaging the washer as will be described later, so that it may be fitted to the shape and dimension of the desired washer.

Within said outer cylinder 2 is rotatably mounted a rotary rod 3 by means of a bearing 4, and at the extremity of said rotary rod is detachably mounted a socket 5 forming a connecting portion for engaging the nut as will be described later, so that it may be fitted to the shape and dimension of the desired nut. At the base of the rotary rod 3 is mounted a winding drum 6.

Said housing 1 is provided with a hydraulic cylinder 7 at a right angle to said outer cylinder 2 and said rotary rod 3; a plunger 8 slidably fitted within the same cylinder 7 is adapted to be moved in a direction tangential to said winding drum 6 by pressurized liquid supplied to the cylinder 7 from said pump A via a high-pressure hose 9; and across the extremity of said plunger 8 is bridged a midway portion of a wire 10 which is wound around the upper and lower peripheries of the winding drum as shown in FIGS. 3 and 5.

In the figure, a spring means 11 provided within the cylinder 7 returns the plunger 8 to its home position when the hydraulic pressure for the plunger is released. By pushing a switch 13 connected to control box B through a power cord 12, a relay in said control box B is actuated, thereby starting pump A. Also in said control box B is provided a pressure switch and a magnetic switch (not shown) to cut off the power supply when the bolt has been tightened to a predetermined torque.

Prior to tightening the nut by the above device, a bolt Q is inserted through members P, P' to be clamped as shown in FIG. 4. On the end of bolt Q a normal washer R is fitted, while to the threaded portion are fitted a washer S as will be described later, and a nut T. The washer S and nut T are tightened to a snug position so as not to rotate together with the bolt Q by conventional means.

Under such a state, the socket 2a of the outer cylinder 2 and the socket 5 of the rotary rod 3 are respectively engaged to said washer S and nut T. The switch is pushed to actuate the relay in the control box B and start the pump A. Pressured liquid is supplied to the cylinder 7, so that the plunger 8 extends against the resilient force of the spring means 11 so as to pull the wire 10 and rotate the winding drum 6 and thus the rotary rod 3. Thus, the nut T is tightened by the socket 5. The reaction force generated thereby, is born by the outer cylinder 2, and since the forces are balanced within the tool C, there is no need to support the tool C with a large force.

In this way, when the nut T has been tightened to a predetermined torque, the pressure switch in the control box is actuated to disconnect the power supply, and thus the fastening operation is finished.

As described, when using the present device it is possible to tighten the bolt with a hydraulic pressure to a predetermined torque. By making use of the washer disposed on the nut side of the bolt to absorb the reaction force created, the fluctuation in the torque value is less than with prior art devices which rely clamping upon impulsive forces utilizing inertia. This allows the clamping device to be simple in structure, light in weight and convenient to handle.

FIGS. 6 to 8 show another device according to the present invention. Coaxially to a housing 21 of device C' is mounted a rotary rod 22 and at its end is mounted a socket 23 for engaging a nut.

The periphery of the center portion of said rotary rod 22 is formed into a pinion 24 as best seen in FIG. 8, and the pinion is located between cylinders 25, 25, which are provided at a right angle to said housing 21 and in parallel to each other. Through opposed openings 25a, 25a, the pinion meshes with the rack 26a which is slidably mounted within each cylinder 25. At the end of said cylinder 25 is bored an opening 25b for supplying pressurized oil thereto. By supplying pressurized oil from an oil pump (not shown) through said opening 25b to each cylinder 25, each piston 26 is advanced with each rack 26a meshed with said pinion 24 to cause the rotary rod 22 to rotate against the resilient force of energized spring means 28 provided between the rear end portion of the rod and the rear end casing 27, while upon stopping the actuation of said oil pump, said rotary rod 22 and consequently each piston 26 are adapted to be returned to their home positions by the resilient force of the energized spring means 28.

At one end of said housing 21 is provided an outer cylinder 29 concentrically surrounding the rotary rod 22 and the box spanner 23 said outer cylinder 29 being adapted to engage the washer as will be described later.

In these figures, 30 represents a handle provided on said rear end casing 27 and 31 represents a gate-shaped carry grip pivotably supported by a ring 32 fitted around the periphery of said casing 27, said carry grip 31 being adapted to be engaged or disengaged with said casing 27 by the engagement or disengagement with locking holes 36 in said ring 32 of a ball 35 which is resiliently pressed by a spring 34 mounted within a cylinder section 33 provided on the side member of said carry grip 31. In addition, 37 represents an actuating switch for the oil pump provided on the carry grip 31, and 38 represents hexagonal prism formed at the extremity of the rotary rod 22, to which prism a desired socket 23 selected in accordance with the size of the nut to be tightened is detachably fitted.

When a pair of steel skeleton members P, P' are to be fastened together by means of said bolt clamping device C', a bolt is inserted through bores in said members P, P'. On the head end of the bolt is fitted a normal washer R, and to the external threaded end is fitted a washer S, to be described later and a nut T. The socket 23 of tool C' is engaged to said nut T and simultaneously the extremity of the outer cylinder is engaged to the washer S. The oil pump (not shown) is driven to supply pressured oil to a pair of cylinders 25, 25 for advancing the pistons 26, and thus the pinion 24 meshing with racks 26a is caused to turn to rotate said rotary rod 22 against the resilient force of the spring 28 and thereby rotate the nut T via the socket 23. Thus, said members P, P' are clamped together.

After the nut has been tightened to a desired torque by tool C', the oil pump is stopped. Thereafter the engagement between the outer cylinder 29 and the washer S as well as the engagement between the socket 23 and the nut T are released, so that said rotary rod 22 and pistons 26 within the respective cylinders 25 are restored to their respective home positions due to the resilient force of the spring 28, and are ready for the next operation.

FIGS. 9 to 14 show various embodiments of the washer which may be used according to the present invention. The washer $S_1$ illustrated in FIG. 9 is designed so as to obtain a large reaction force upon tightening the bolt, by cutting and raising separated tongues $s_1$ from the outer periphery of the body to enhance the coefficient of friction between the washer and the member to be clamped.

Figure 10A:
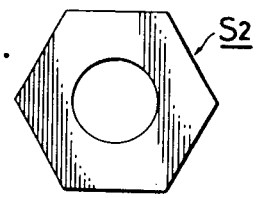
Figure 10B:
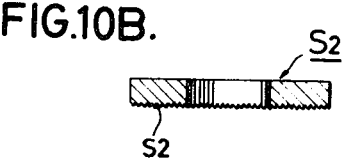

The washer $S_2$ illustrated in FIG. 10 has its lower surface roughened in order to enhance the coefficient of friction between the washer and member to be clamped.

Figure 11A:
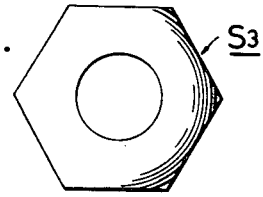
Figure 11B:
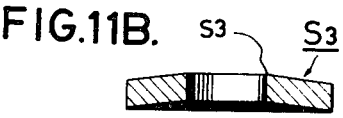

The washer $S_3$ illustrated in FIG. 11 is designed so as to obtain a large reaction force upon tightening the bolt by forming a central raised portion (an upheaved portion) at the interior part of the body to enhance the engaging force between the washer and the outer cylinder of said bolt-clamping device by generating a strong resilient force upon tightening the bolt.

Figure 12A:
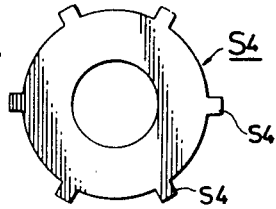
Figure 12B:
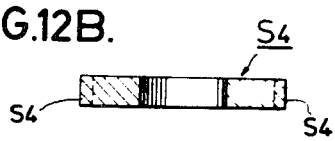

The washer $S_4$ illustrated in FIG. 12 is designed so as to obtain a large reaction force upon tightening the bolt by providing projections $s_4$ extending in the radial direction along the outer periphery of the washer body so as to make the projections engage with slots provided in the bolt-clamping device and thereby enhance the engaging force between the washer and the outer cylinder.

Figure 13A:
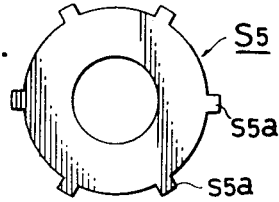
Figure 13B:
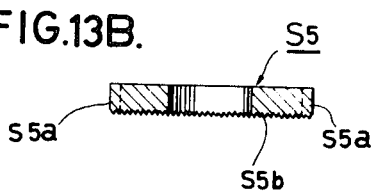
Figure 14A:
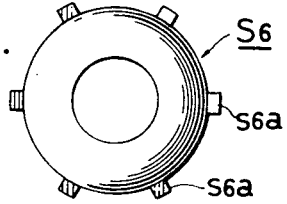
Figure 14B:
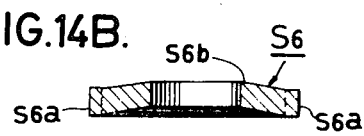

The washer $S_5$ illustrated in FIG. 13 is provided with projections $s_{5}a$ similar to the projection $s_4$ of said washer $S_4$ and simultaneously has one surface of the body formed as a rough surface $S_5b$.

In addition, the washer $S_6$ illustrated in FIG. 14 is provided with projections $s_6a$ similar to those of the above-described embodiments around the body, and simultaneously provided with an upheaved portion $S_6b$ at the interior part of the body.

While the present invention has been described above with reference to its preferred embodiments, of course, it should not be limited to these embodiments, and many changes and modifications could be done within the scope of the invention without departing from the spirit of the invention.

What we claim is:

1. A device for tightening a bolt into clamping engagement with a workpiece, comprising a rotary rod, drive means positioned for applying a predetermined torque to rotate said rotary rod, said drive means including a hydraulic ram and cooperating members for converting the rectilinear movement of said hydraulic ram into a rotational movement of the rotary rod, an outer sleeve extending coaxially over said rotary rod, means for engaging a nut and washer at free ends of said rotary rod and said outer sleeve respectively so that, during the tightening of said nut onto said bolt by torque applied to said nut through said rotary rod, the resultant reaction force is taken up by the connection between the outer sleeve and the washer fitted onto the bolt between the nut and workpiece.

2. A device as claimed in claim 1, wherein the cooperating members for converting rectilinear movement of said hydraulic ram into a rotational movement of the rotary rod comprise a drum rotatable with said rod and having a peripheral surface engaged with a wire element operatively connected to said ram.

3. A device as claimed in claim 1, wherein the cooperating members for converting rectilinear movement of said hydraulic ram into rotatable movement of said rotary rod, comprise a rack movable with said ram and cooperating with a pinion arranged to rotate said rod.

4. A device as claimed in claim 1, wherein said washer is provided with an outwardly extending projection, and said engaging means of said outer sleeve comprises a groove adapted to engage said projection.

5. A device as claimed in claim 4, wherein said washer has a roughened surface for engagement with said workpiece.

6. A device as claimed in claim 1, wherein said washer has a roughened surface for engagement with said workpiece.

* * * * *